(12) United States Patent
Liu et al.

(10) Patent No.: US 9,449,071 B2
(45) Date of Patent: *Sep. 20, 2016

(54) PROVIDING RECONSTRUCTED DATA BASED ON STORED AGGREGATE DATA IN RESPONSE TO QUERIES FOR UNAVAILABLE DATA

(71) Applicant: Cisco Technology, Inc., San Jose, CA (US)

(72) Inventors: Ying Liu, San Jose, CA (US); Shahrokh Sadjadi, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 13/937,766

(22) Filed: Jul. 9, 2013

(65) Prior Publication Data
US 2013/0297609 A1 Nov. 7, 2013

Related U.S. Application Data

(63) Continuation of application No. 13/011,782, filed on Jan. 21, 2011, now Pat. No. 8,484,212.

(51) Int. Cl.
*G06F 17/30* (2006.01)
*G06F 17/00* (2006.01)

(52) U.S. Cl.
CPC ... *G06F 17/30598* (2013.01); *G06F 17/30312* (2013.01)

(58) Field of Classification Search
CPC ............ G06K 9/6226; G06K 9/6223; G06K 9/00147; G06K 9/6218; G06K 9/6254; G06K 9/342; G06K 9/6219; G06K 9/626; G06K 15/00; G06K 15/186; G06K 9/00234; G06K 9/00369; G06K 9/6217; G06K 9/627; G06K 9/6272; G06K 9/6273; G06K 9/6284; G06F 17/30598

See application file for complete search history.

(56) References Cited

U.S. PATENT DOCUMENTS 5,187,658 A * 2/1993 Cline .................. G06F 19/3437
324/306
6,263,334 B1 7/2001 Fayyad et al.
(Continued)

OTHER PUBLICATIONS

U.S. Appl. No. 13/011,782, filed Jan. 21, 2011, Office Action, Jun. 21, 2012.

(Continued)

*Primary Examiner* — Yicun Wu
(74) *Attorney, Agent, or Firm* — Hickman Palermo Becker Bingham LLP; Malgorzata A. Kulczycka

(57) ABSTRACT

In an embodiment, a method comprises dividing collected data into data clusters based on proximity of the data and adjusting the clusters based on density of data in individual clusters. Based on first data points in a first cluster, a first average point in the first cluster is determined. Based on second data points in a second cluster, a second average point in the second cluster is determined. Aggregate data, comprising the first average point and the second average point, are stored in storage. Upon receiving a request to provide data for a particular coordinate, the reconstructed data point is determined by interpolating between the first average point and the second average point at the particular coordinate. Accordingly, aggregated data may be stored and when a request specifies data that was not actually stored, a reconstructed data point with an approximated data value may be provided as a substitute.

20 Claims, 9 Drawing Sheets

(56) References Cited

U.S. PATENT DOCUMENTS

| | | | |
|---|---|---|---|
| 6,263,337 B1* | 7/2001 | Fayyad | G06F 17/30705 |
| 6,397,166 B1* | 5/2002 | Leung | G06K 9/6221 |
| | | | 702/179 |
| 6,636,862 B2 | 10/2003 | Lundahl et al. | |
| 7,174,344 B2* | 2/2007 | Campos | G06F 17/30598 |
| 7,952,963 B2* | 5/2011 | Cheung | G01K 1/02 |
| | | | 367/136 |
| 8,195,662 B2 | 6/2012 | Tsai et al. | |
| 2003/0212519 A1* | 11/2003 | Campos | G06F 17/30601 |
| | | | 702/101 |

OTHER PUBLICATIONS

U.S. Appl. No. 13/011,782, filed Jan. 21, 2011, Final Office Action, Dec. 5, 2012.

U.S. Appl. No. 13/011,782, filed Jan. 21, 2011, Notice of Allowance, Mar. 8, 2013.

* cited by examiner

PROVIDING RECONSTRUCTED DATA BASED ON STORED AGGREGATE DATA IN RESPONSE TO QUERIES FOR UNAVAILABLE DATA

BENEFIT CLAIM

This application claims the benefit under 35 USC §120 as a continuation of application Ser. No. 13/011,782, filed Jan. 21, 2011, the entire contents of which is hereby incorporated by reference in their entirety, as if fully set forth herein, for all purposes. The applicants hereby rescind any disclaimer of claim scope in the parent application or the prosecution history thereof and advise the USPTO that the claims in this application may be broader than any claim in the parent application.

TECHNICAL FIELD

The present disclosure is generally related to network management and more specifically to reconstructing data values from aggregate data.

BACKGROUND

A problem with managing a large amount of data is difficulty in providing sufficient storage for the data. For example, storing all collected network performance data in large data collection systems requires a vast amount of storage space. At the same time, since some of the collected data is never used in further processing, in practice, storing all collected network performance data may be unnecessary.

Another problem with managing a large amount of data is complexity of organizing the data for a future use. For example, indexing and storing the large amount of data may be a complex and time consuming process.

Still another problem with managing a large amount of data involves processing search queries issued to large databases. Due to the fact that large databases are often implemented as distributed databases with complex indexing schemes, generating execution plans for search queries issued to such databases and executing the execution plans may be a time consuming and inefficient process.

Yet another problem with a large amount of data is the impact of collecting, storing and processing the data upon data traffic in a network. Collecting, storing and processing the large amount of data require transmitting a great deal of data between nodes in the network, and thus may significantly impact communications bandwidth in the network and the speed in which the nodes communicate with each other.

DETAILED DESCRIPTION

Figure 1:
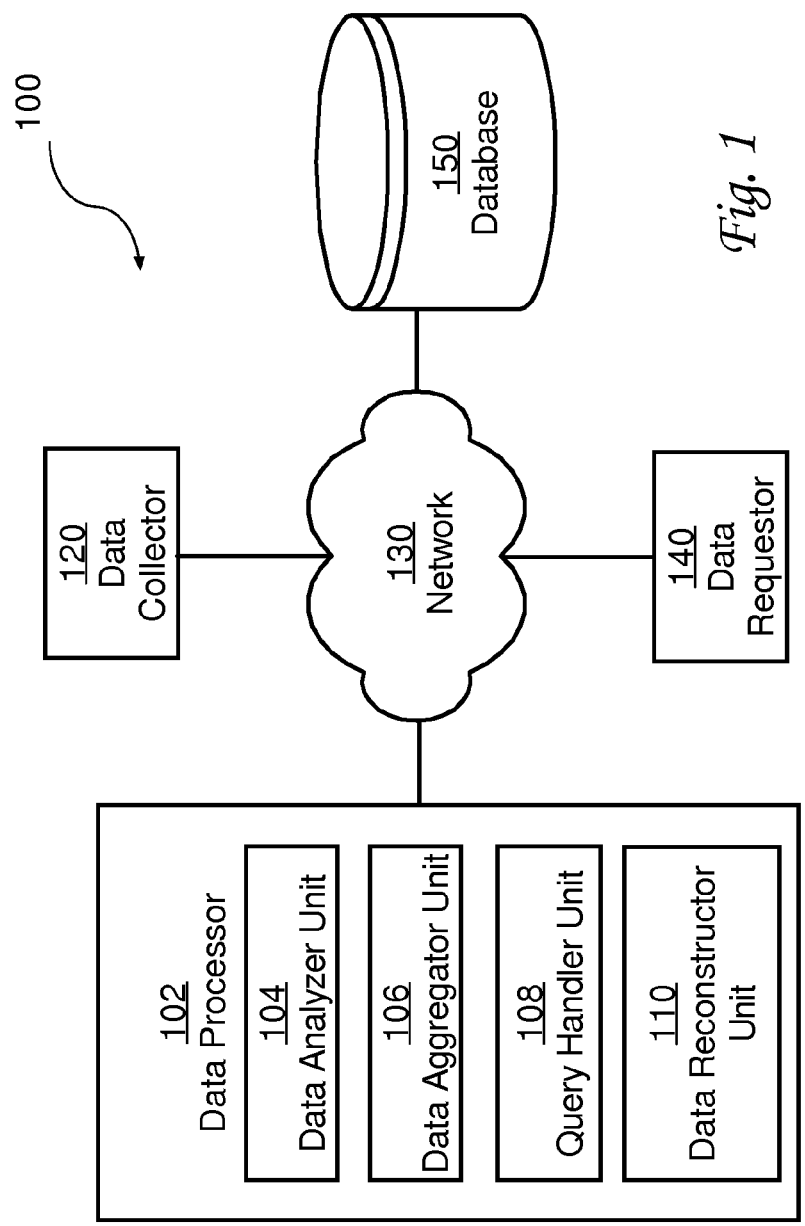
FIG. 1 illustrates an embodiment of a network data processor in a network.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Partitioning Collected Raw Data
   4.0 Determining Average Points in Data Point Clusters
   5.0 Determining Segments Connecting Average Points
   6.0 Creating a Representative Data Point Using Aggregate Data
   7.0 Implementation Mechanism—Hardware Overview
   8.0 Extensions and Alternatives
   1.0 General Overview In an embodiment, a method comprises dividing collected data into data clusters based on proximity of the data and adjusting the clusters based on density of data in individual clusters. An initial size of the clusters may be set based on a recommended quantity of data points within each cluster, and may allow a uniform distribution of the data points among the clusters. The size of the clusters may be adjusted by modifying the quantity of data points in the individual clusters.

In an embodiment, based on data points in a first cluster, a first average point in the first cluster is determined. Additionally, a first mean value may be computed from data values of the data points in the first cluster.

In an embodiment, based on data points in a second cluster, a second average point in the second cluster is determined. Additionally, a second mean value may be computed from data values of the data points in the second cluster.

In an embodiment, a first maximum value and a first minimum value of the data points in the first cluster are determined, and a second maximum value and a second minimum value of the data points in the second cluster are determined.

In an embodiment, the method further comprises storing aggregate data as representative of collected raw data for each cluster. For example, the aggregate data for a first cluster may comprise any of the following: a first average point, a first maximum value, a first minimum value and a first mean value. The aggregate data for a second cluster may comprise any of the following: a second average point, a second maximum value, a second minimum value and a second mean value.

Upon receiving a request to provide data for a particular coordinate at which actual data was not previously stored due to aggregation or other reasons, a reconstructed data point is determined by interpolating between a corresponding first average point and a second average point at the particular coordinate. The particular coordinate has a value representing a time point in a time domain. Interpolating between the first average point and the second average point at the particular coordinate may comprise determining a line segment that connects the first average point with the second average point and determining the reconstructed data point as located at the intersection of the line segment and the particular coordinate.

In an embodiment, a reconstructed data point comprises an approximated value of a data point that is computed for a particular coordinate using aggregate data. The approximation is determined with an accuracy limited by error bounds. The error bounds may be computed for the reconstructed data point based on a first maximum value, a first minimum value, a second maximum value and a second minimum value, or some other information.

In an embodiment, the method further comprises determining approximated values using aggregate data for a plurality of time points, and computing approximated error bounds for the respective plurality of time points.

Embodiments further include computer-readable storage media storing sequences of instructions which when executed by a processor cause performing the method, data processing configured to implement the method, and special-purpose computers configured to perform the method.

2.0 Structural and Functional Overview

In general, the present disclosure describes determining aggregate data from collected raw data and applying approximation and interpolation techniques in a novel way to reconstruct data points from the aggregate data. Embodiments may be used in networks featuring data servers that collect and store large quantities of raw data. The collected raw data may represent a variety of network related data, such as network performance data, network traffic data, network monitoring data, system acquisition data, experiment collection data, etc.

In some implementations, due to the nature and abundance of collected raw data, storing all collected data may be neither possible nor desirable. For example, some of the collected raw data may never be used or processed. Therefore, instead of storing all the collected raw data, which would require an exorbitant storage space and resources, it may be sufficient to generate and store only aggregated data or other representations of the raw data. Storing only the aggregate data may require less storage space than storing all the collected raw data.

In an embodiment, the reconstructed data point is determined using an interpolation technique.

FIG. 1 illustrates an embodiment of a network data processor 102 in a system 100. In an embodiment, system 100 comprises a data processor 102, a data collector 120, a network 130, a data requestor 140 and a database 150.

For simplicity and for purposes of illustrating clear examples, FIG. 1 shows one data processor 102, one data collector 120, one network 130, one data requestor 140 and one database 150. However, practical embodiments may use any number of processors 102, data collectors 120, networks 130, data requestors 140 and databases 150.

In an embodiment, network 130 is a packet-switched data network and nodes in system 100 comprise data servers, routers, switches, or other infrastructure elements; in some embodiments, the nodes may comprise database servers, data processing computers or other data collecting and data processing elements.

Data processor 102, data collector 120, data requestor 140 and database server 150 may use hardware logic such as in an application-specific integrated circuit ("ASIC"), field-programmable gate array ("FPGA"), system-on-a-chip ("SoC") or other combinations of hardware, firmware and/or software.

In an embodiment, data processor 102 is configured to implement a version of data transmission protocol to transmit data such as TCP. In another embodiment, data processor 102 implements another transport layer protocol such as SCTP.

Furthermore, data processor 102 may be configured to execute data management software applications written in various database computer languages designed for managing data in database management systems. For example, data processor 102 may be configured to execute network management application, network monitoring application, network performance applications, etc. Moreover, data processor 102 may be configured to execute Software Structured Query Language (SQL) applications for managing data in relational database management systems (RDBMS).

In an embodiment, data processor 102 is communicatively coupled with a data collector 120 and a database 150. Data collector 120 may be any device capable of collecting any amount of data transmitted by any entities in system 100.

Data collector 120 may collect a variety of data For example, data collector 120 may collect a variety of network performance data, such as bandwidth utilization data, a quantity of data packets transmitted via selected communications connections, a round trip time for packets transmitted via selected communications connections, a backbone packet loss, circuit performance data, a level of service available at communications connections, etc.

In an embodiment, data collector 120 collects topology specific network data, including information about active nodes, failed nodes, restarted nodes, backup nodes, standby nodes, etc., available at certain moments in time.

In an embodiment, data collector 120 may collects data related to network service calls, customer service, network repairs, network failures, etc.

In an embodiment, data collector 120 collects data generated or collected by other entities in system 100. For example, data collector 120 may collect statistical data, research result data, system acquisition data, etc.

In an embodiment, data collector 120 collects or receives raw data from other data collectors that are sent to data collector 120 cyclically or at certain time intervals. Raw data may be collected in batches that have manageable sizes and that represent a portion of a large database.

In an embodiment, data collector 120 stores raw data in database server 150. Alternatively, or in addition to storing the raw data in database server 150, data collector 120 may send the raw data to data processor 102.

Data processor 102 retrieves collected raw data directly from data collector 120 or retrieves the collected raw data from database 150.

In an embodiment, data processor 102 comprises a data analyzer unit 104, a data aggregator unit 106, a query handler unit 108 and a data reconstructor unit 110. Each or some of the units may be implemented as hardware logic, firmware, or a combination of hardware with software elements.

Furthermore, each of the units may be implemented separately, or some of the units may be combined together into larger units.

In an embodiment, data analyzer unit 104 receives collected raw data and partitions the collected data into clusters. The size of each cluster may be predetermined or specified in configuration data, and the clusters may be determined by dividing the collected data into clusters having about the same quantity of data points selected from the collected data.

In an embodiment, the size of the clusters may be modified and adjusted depending on a variety of criteria. For example, a quantity of data points in each or some of the clusters may be adjusted so that all data points in each cluster are within a particular radius.

In an embodiment, data aggregator unit 106 is configured to further process data point values in each cluster. For example data aggregator unit 106 may be configured to determine an average data value based on all the collected raw data in a cluster. The average data value may be an arithmetical mean value, a geometrical average value, a weighted value or any other average value derived any of the known methods.

In an embodiment, data aggregator unit 106 is configured to determine minimum and maximum values for each cluster of the collected raw data. For example, data aggregator unit 106 may be configured to determine a minimum data point from all the data points in the cluster. Further, data aggregator unit 106 may be configured to determine a maximum data point from all the data points in the cluster. In some cases, for example if a cluster has merely one collected raw data point, the minimum data point may coincide with the maximum data point and with an average data value for the cluster.

In an embodiment, data requestor 140 is configured to generate and submit a search query to a query handler unit 108 of data processor 102. In another embodiment, data requestor 140 is configured to generate and submit a search query directory to database server 150. The search queries that are submitted directly to database server 150 are not subject of this disclosure.

In an embodiment, data requestor 140 includes any number of entities that are capable or are configured to generate a search query. Examples of data requestors 140 include a user, a client application, a computer node, a software application, a system administrator, etc.

A search query is a query formed in compliance with data communication protocol and specifies a request for data. For example, a search query may be a request for data representing a particular network performance metric at a particular point in time. A query may be an SNMP request for the value of a particular MIB object value that is identified by a MIB object identifier (OID). According to another example, a search query may be a request for data representing bandwidth that was available in a communications network at a particular point in time. According to other example, a search query may be a request for data representing a quantity of failed servers in a communications network at a particular point in time.

In an embodiment, a search query requesting data is received by query handler unit 108. In an embodiment, query handler unit 108 is configured to receive and process a search query.

Upon receiving a search query, query handler unit 108 analyzes the search query and determines whether data processor 102 is capable of generating search results for the search query. For example, query handler unit 108 may determine whether the search query is a syntactically valid query, i.e., whether the search query complies with the query protocol implemented by data processor 102. Furthermore, query handler unit 108 may attempt to determine whether the search query is directed to a set of raw data that data processor 102 has already processed.

In an embodiment, if a search query is a valid query but data processor 102 has not already processed the set of raw data to which a received search query is directed, then data processor 102 (in particular, and query handler unit 108) may be unable to process the query and generate search results for the search query. In such a case, query handler unit 108 may send the search query back to data requestor 140 along with a message indicating that data processor 102 is unable to generate search results for the search query.

In an embodiment, if a search query is a valid query and data processor 102 has already processed the set of raw data to which a received search query is directed, then query handler unit 108 may transmit the search query to a data reconstructor unit 110.

In an embodiment, data reconstructor unit 110 is configured to create and provide one or more reconstructed data points from aggregate data. For example, upon receiving a request to provide a data value for a particular time point or other coordinate based on aggregate data generated for the collected data, data reconstructor unit 110 may determine that the actual data value for that coordinate was not stored, but may determine two clusters that contain respective average points which can be used to create and provide a reconstructed data point for the particular coordinate.

In an embodiment, data reconstructor unit 110 determines a subdomain that spans two clusters and that includes a particular time point or other coordinate for which a reconstructed data point is requested. For example, each of the clusters generated by data analyzer unit 102 may be defined over a time domain. Furthermore, if a first average point in a first cluster is determined for $t_1$ and a second average point in a second cluster is determined for $t_2$, then the time subdomain for the first and second cluster is $<t_1, t_2>$. Moreover, if the particular coordinate is greater than $t_1$ but lesser than $t_2$, then the particular coordinate belongs to the subdomain $<t_1, t_2>$, and the reconstructed data point for the particular coordinate may be computed from the first average point and the second average point, as it is described below.

Figure 9:
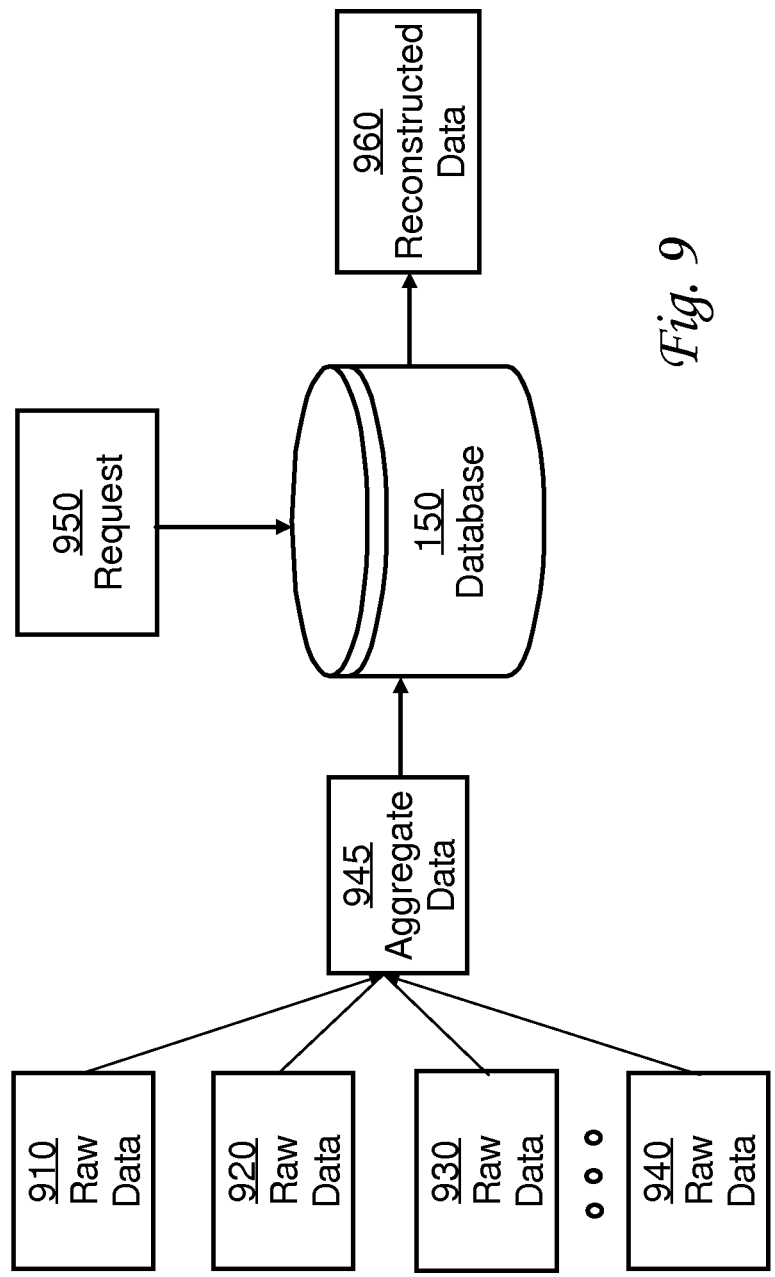
FIG. 9 illustrates data flow to and from a database.

FIG. 9 illustrates data flow to and from a database 150. In an embodiment, raw data 910, 920, 930, 940, etc., are collected from various sources. Although FIG. 9 depicts four pieces of raw data, 910, 920, 930 and 940, any quantity of raw data pieces may be collected.

In an embodiment, collected raw data 910-940 are aggregated into aggregate data 945 according to any of the schemes described above.

In an embodiment, only aggregate data 945 are stored in a database 150. The raw data (910, 920, 930, 940, etc.) are not stored in the database 150. For example, for a particular cluster of raw data, the raw data for the particular cluster are not stored in database 150. Instead, only the aggregate data 945 are stored in database 150.

In an embodiment, upon receiving a request for reconstructing a data value from aggregate data stored in database 150, the aggregate data 945 stored in database 150, not raw data 910-940, are used to determine a reconstructed data point value 960. The reconstructed data point value 960 is computed based on the aggregate data 945 stored in database 150, not based on raw data 910, 920, 930 or 940.

In an embodiment, storing merely aggregate data 945 in a database 150, but not raw data 910, 920, 930 or 940, diminishes demand on a size and capacity of database 150. Furthermore, since the aggregate data 945 provides an adequate representation of raw data 910-940, reconstructing data point value 960 merely from the aggregate data 945 is sufficient for most applications, as described below.

3.0 Partitioning Collected Raw Data

Figure 2:
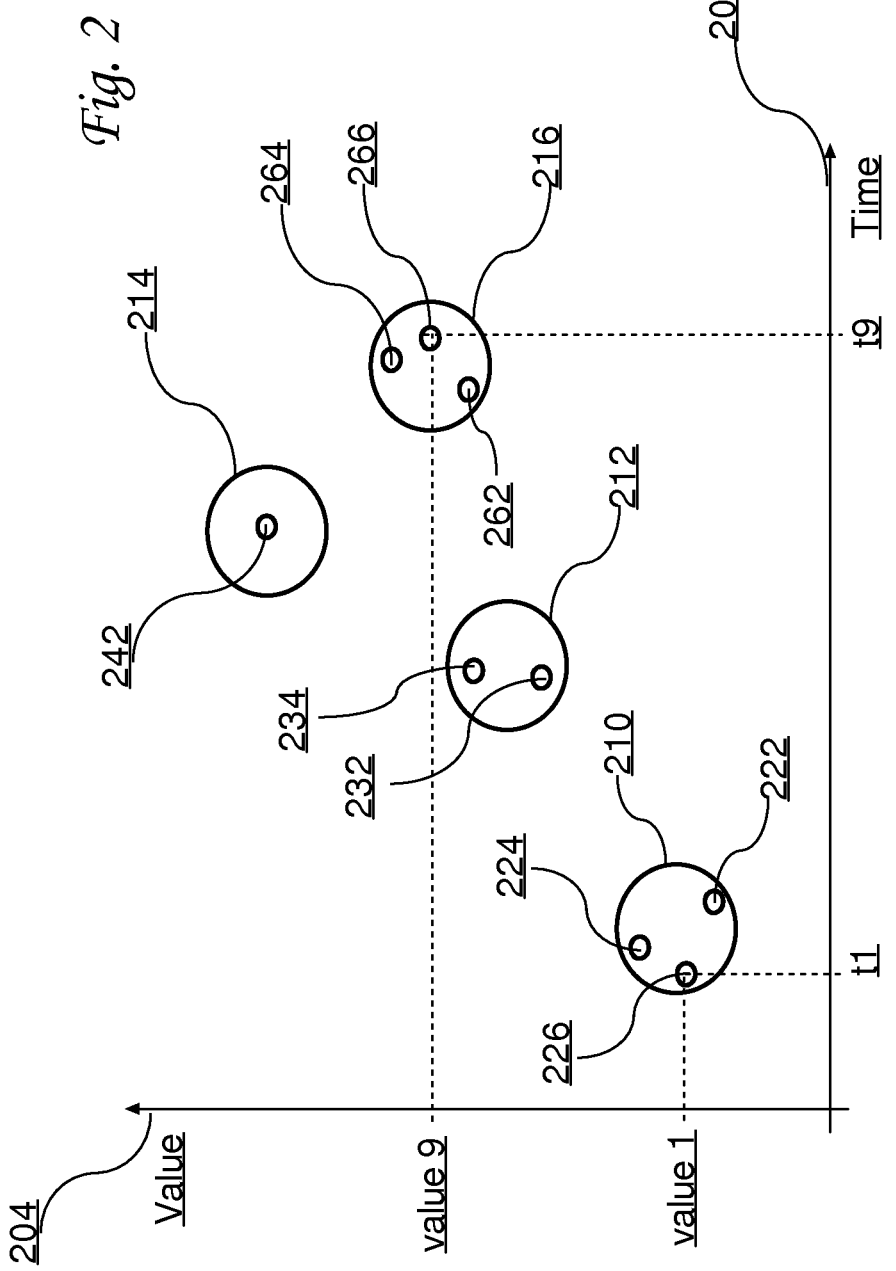
FIG. 2 illustrates an embodiment of partitioning collected raw data.

FIG. 2 illustrates an embodiment of partitioning collected raw data. Collected raw data are data collected by a data collector unit 120, as described in FIG. 1.

Collected raw data may represent a variety of collected information. For example, collected raw data may represent network performance data collected by a network monitoring system, network traffic data monitored by a network traffic controllers, etc.

In an embodiment, collected raw data comprise data points that can be depicted in a plane Cartesian coordinate system, as illustrated in FIG. 2. In another embodiment, each of the collected data points may be represented in a three-dimensional system, a four-dimensional system or any other multi-dimensional system known in the art.

In the plane Cartesian coordinate system, a horizontal axis 202 represents a time scale, and a vertical axis 204 represents a point value scale. A data point in the plane Cartesian coordinate system may have an associated unique pair of numerical coordinates. For example, a collected raw data point may be represented in the Cartesian coordinate plane by a pair {time, value}.

In an embodiment, in a Cartesian coordinate system depicted in FIG. 2, each raw data point has an associated a unique pair of numerical coordinates, each of which represents a signed distance from the coordinate system origin to a projection of the raw data point 226 onto the respective axis. For example, as depicted in FIG. 2, a raw data point 226 has an associated pair $\{t_1, value\ 1\}$, which means that the raw data point 226 was sampled at time $t_1$, and that, at time $t_1$, a value of the raw data point 226 was "value 1." Thus, as the raw data were collected, at a particular time $t_1$, the collected raw value was "value 1." For example, if the raw data represent bandwidth in a communications network, then according to one interpretation, $\{t_1, value\ 1\}$ may mean that at the particular "$t_1$," bandwidth in the communications network was at "value 1," wherein "value 1" may be represented by a percentage value.

According to another example, as depicted in FIG. 2, raw data point 266 has an associated pair $\{t_9, value\ 9\}$, which means that a raw data point 266 was sampled at time $t_9$, which is different than time $t_1$, and that at time $t_9$, a value of the raw data point 266 was "value 9."

In an embodiment, raw data is collected or sampled in discrete times represented along a horizontal time axis 202. Values collected at each of the discrete times may be represented along a vertical time axis 204. While each of the discrete times is unique, the collected values do not have to be unique. Therefore, raw data points sampled in two different times may have the same values. For example, even though a raw data point 234 was sampled earlier than a raw data point 262, both raw data points 234 and 262 have assigned the same value on the vertical axis 204.

In another embodiment, collected raw data comprise data points in a three dimensional space, a four dimensional space, etc. In an n-dimensional space, each raw data point may have associated "n" values, each of which represents a value of one of the "n" parameters defined in the n-dimensional space. For example, if raw data represents bandwidth values for each of sub-networks in a communications network, then $\{t_1, value\ 1, sub-network\ 1\}$ may be interpreted that at the particular "$t_1$," bandwidth in the "sub-network 1" of the communications network was at "value 1," wherein "value 1" is represented by a percentage value. When comparing $\{t_1, value\ 1, sub-network\ 1\}$ with $\{t_2, value\ 2, sub-network\ 1\}$, if "value 1" is greater than "value 2," then it can be determined that for sub-network 1, more bandwidth was available at "$time_1$" than at "$time_2$."

Referring again to FIG. 2, in an embodiment, collected raw data are divided into partitions. For example, the collected data may be partitioned into clusters. In an embodiment, all the clusters may have the same quantity of raw data points.

A size of the clusters may be determined automatically during a system initialization, or based on configuration data, or by a system administrator or another process, system or application. For example, the size of each cluster may be controlled by a system configuration parameter and may be adjusted according to the type of the collected raw data, capacity of the available storage, customer's preferences, etc. For instance, the size of each cluster may be obtained from a dynamic variable, having a relatively small value, and later increased or decreased.

In one example, a size of each cluster could be five (5). In this example, collected raw data is divided into clusters in such a way that each cluster contains five raw data points. For instance, the first five raw data points may belong to the first cluster; the next five raw data points may belong to the second cluster, and so forth. However, the collected raw data may be partitioned into clusters using any other approach.

In an embodiment, a size of each cluster is modified according to specified criteria. One of the criteria may be density of each cluster.

In an embodiment, raw data points are partitioned into clusters by placing all data points that are within a specified proximity or distance into the same cluster, as depicted in FIG. 2.

In FIG. 2, in an embodiment, raw data points have been partitioned into four clusters 210, 212, 214 and 216. All actually collected data points that are within a particular region, and thus within a particular proximity to one another, are placed in a particular cluster. For example, a cluster 210 contains three raw data points 222, 224 and 226. A cluster 212 contains two raw data points 232 and 234. A cluster 214 contains only one raw data point 242. A cluster 216 contains three raw data points 262, 264 and 266.

4.0 Determining Average Points in Data Point Clusters

Figure 3:
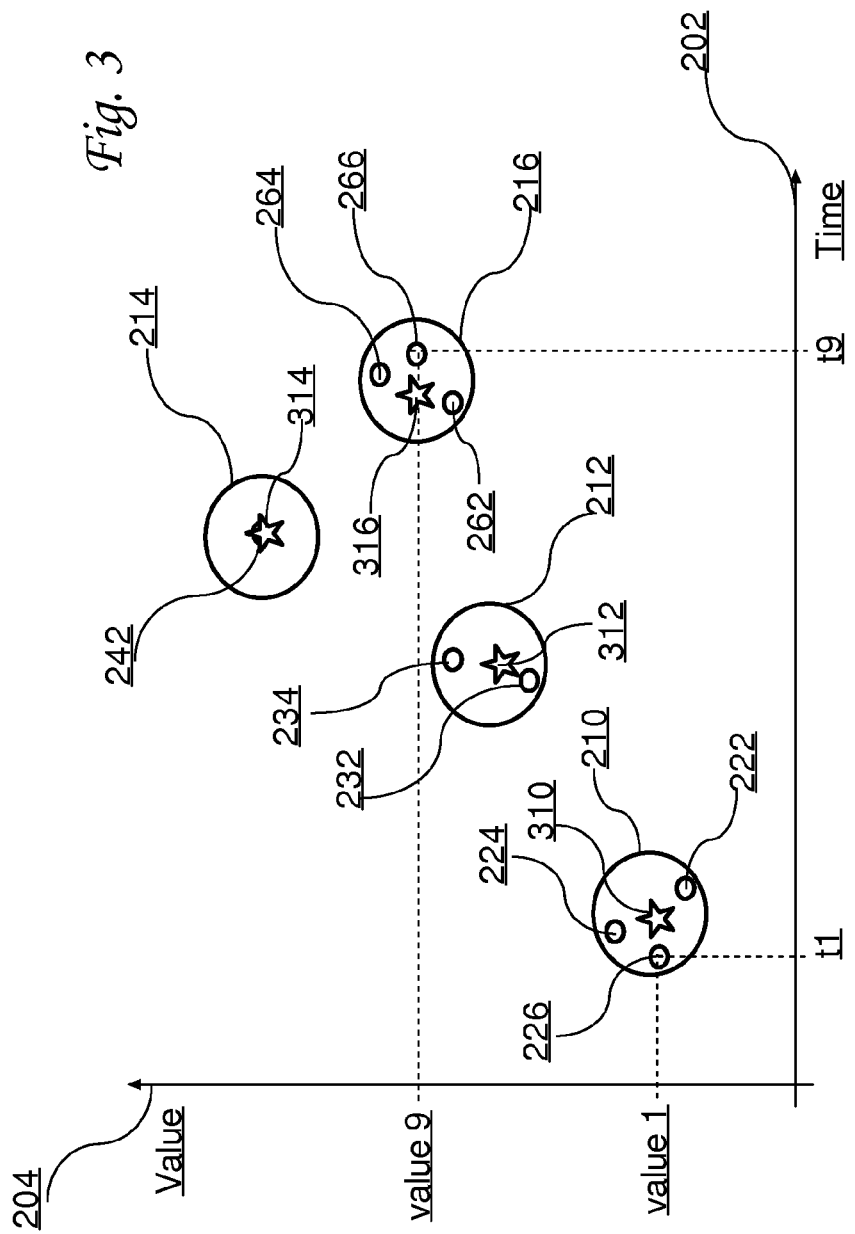
FIG. 3 illustrates an embodiment of determining average points in data point clusters.

FIG. 3 illustrates an embodiment of determining average points in data point clusters.

In an embodiment, collected raw data points are two-dimensional data points in a time domain 202 and having values in a value domain 204. In an embodiment depicted in FIG. 3, raw data points include points 222, 224, 226, 232, 234, 242, 262, 264 and 266. The raw data points are partitioned into clusters 210, 212, 214 and 216. As depicted in FIG. 3, a cluster 210 contains three raw data points 222, 224 and 226, a cluster 212 contains two raw data points 232 and 234, a cluster 214 contains only one raw data point 242, and a cluster 216 contains three raw data points 262, 264 and 266.

In an embodiment, raw data in each of the clusters is used to determine an average data point in the respective cluster. For example, in a first cluster 210, three raw data points 222, 224 and 226 are used to determine a first average point 310. Furthermore, in a second cluster 212, two raw data points 232 and 234 are used to determine a second average point 312. Since a third cluster 214 contains only one raw data point 242, only raw data point 242 is used to determine a third average point 314. In a fourth cluster 216, three raw data points 262, 264 and 266 are used to determine a fourth average point 316.

There are many approaches for computing an average point, including computing an arithmetic mean value, a geometric mean value, a harmonic mean value, a quadratic mean value, a weighted mean value, a median value, a midrange value, etc.

In an embodiment, an average point for a cluster containing a raw data points is computed using an approach for computing an arithmetic mean value. According to the approach, if a cluster contains "n" raw data points, then an arithmetic mean value is computed by adding the values of the raw data points, and dividing the sum by "n."

Referring again to FIG. 3, in an embodiment, if the first cluster 210 contains three raw data points 222, 224 and 226, then an arithmetic mean value for the first cluster is computed by adding the values of the raw data points 222, 224 and 226, projected onto a vertical value axis 204, and the sum is divided by n=3. The resulting arithmetic mean value is a value of the first average point in the first cluster. That component corresponds to the value coordinate that can be projected onto the vertical value axis 204.

In the next step, an arithmetic mean time coordinate is computed using time components of the raw data points 222, 224 and 226, projected onto a horizontal time axis 202. This may be performed by adding the time coordinate values of the raw data points 222, 224 and 226, and dividing the sum by n=3. That component corresponds to the time coordinate that can be projected onto the horizontal time axis 202.

Using the above described approach, a value coordinate and a time coordinate for a first average point in the first cluster are computed. Referring again to FIG. 3, a first average point 310 may have an associated pair {first average time, first average point value}, each of which is computed according to the approach described above.

The above approach for computing an arithmetic mean value coordinate and an arithmetic mean time coordinate may be applied to each cluster of raw data points. For example, the above approach may be used to compute a first average point 310 in the first cluster 210, a second average point 312 in the second cluster 212, a third average point 314 in the third cluster 214 and a fourth average point 316 in the fourth cluster 216. Any of other approaches listed above may be used to determine coordinates of the average points in the clusters.

In an embodiment, in each cluster a maximum value and a minimum value are determined. Referring again to FIG. 3, in a first cluster 210, containing raw data points 222, 224 and 226, a first maximum value is the raw data point 224 because the raw data point 224 has the highest value projected onto a vertical value axis 204 from all the raw data points 222, 224 and 226. Furthermore, in the first cluster 210, a first minimum value is the raw data point 222 because the raw data point 222 has the lowest value projected onto a vertical value axis 204 from all the raw data points 222, 224 and 226.

Similarly, referring again to FIG. 3, in a second cluster 212, containing raw data points 232 and 234, a second maximum value is the raw data point 234 because the raw data point 234 has the highest value projected onto a vertical value axis 204 from all the raw data points 232 and 234, while a second minimum value is the raw data point 232 because the raw data point 232 has the lowest value projected onto a vertical value axis 204 from all the raw data points 232 and 234.

A third cluster 214, depicted in FIG. 3, contains only one raw data point 242. Therefore, the raw data point 242 is a third maximum value and a third minimum value in the third cluster 214.

In a fourth cluster 212, containing raw data points 262, 264 and 266, a fourth maximum value is the raw data point 264 because the raw data point 264 has the highest value projected onto a vertical value axis 204 from all the raw data points 262, 264 and 266, while a fourth minimum value is the raw data point 262 because the raw data point 262 has the lowest value projected onto a vertical value axis 204 from all the raw data points 262, 264 and 266.

5.0 Determining Segments Connecting Average Points

Figure 4:
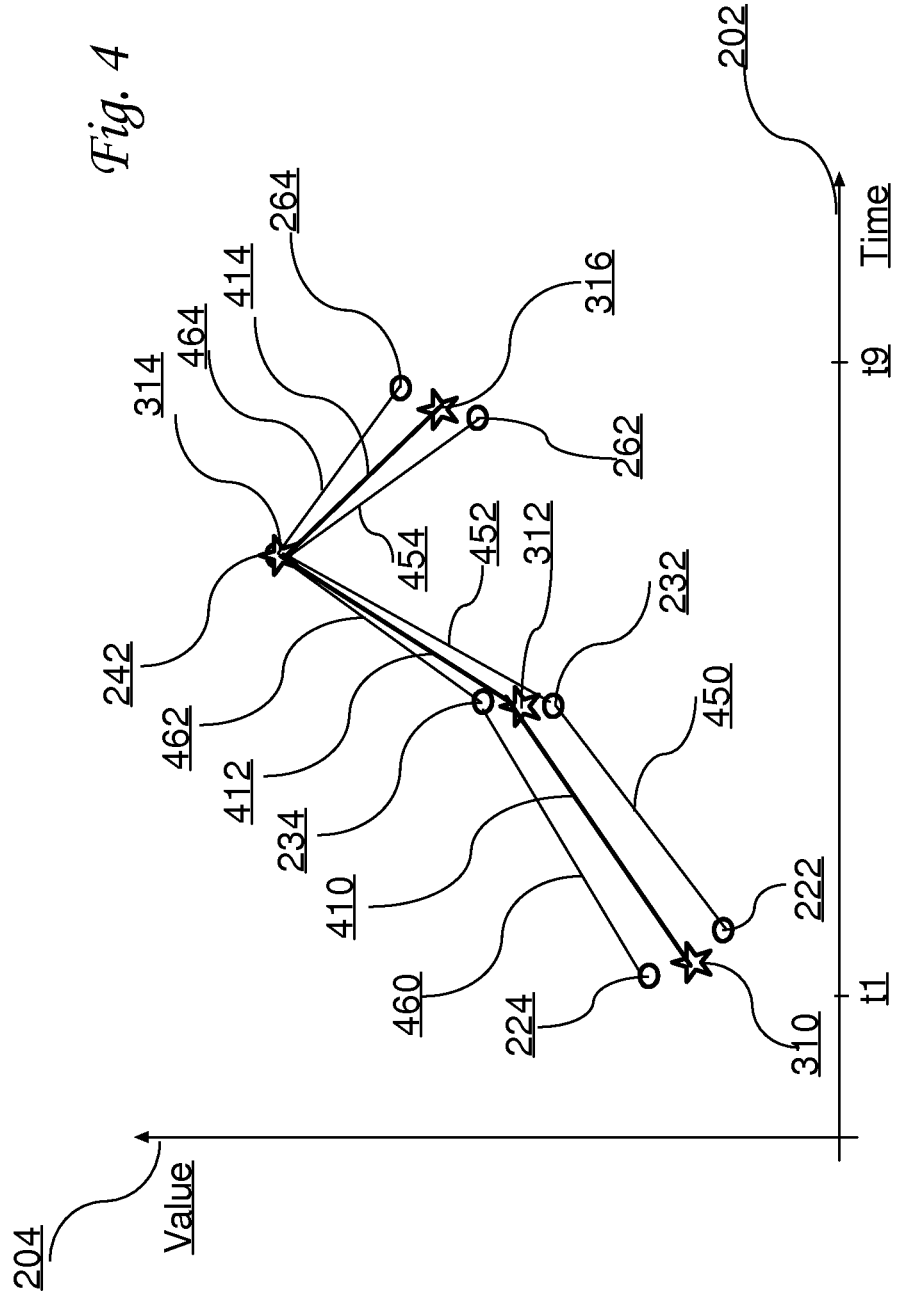
FIG. 4 illustrates an embodiment of determining segments connecting average points in data point clusters.

FIG. 4 illustrates an embodiment of determining segments connecting average points of data point clusters. In an embodiment, average points in two neighboring clusters depicted in a plane Cartesian coordinate system are connected. A connection between two average points may be determined as a line segment or a curve segment, such as a parametric Bézier curve, a spline, a non-uniform rational Bézier (NURB) spline, etc.

Referring again to FIG. 4, in an embodiment, average points are connected via line segments. In FIG. 4, an average point 310 is connected with an average point 312; the average point 312 is connected with an average point 314; and the average point 314 is connected with an average point 316. The average points 312, 314 and 316 were determined as it was described for FIG. 3.

In an embodiment, two average points are connected by a line segment. The line segment may be defined using a starting point, an ending point and a slope. Referring again to FIG. 4, a first line segment between a first average point 310 and a second average point 312 has a starting point coinciding with the first average point 310 and an ending point coinciding with the second average point 312. A slope of the first line segment is a gradient of a line that connects the first average point 310 and the second average point 312.

A slope of a line may be computed using any of a variety of approaches. For example, the slope may be determined as a ratio of the altitude change to the horizontal distance between two points on the line. The ratio of the altitude change may be computed as a ratio of a "rise" of a corresponding line segment divided by a "run" between two points on the line. Given two average points on a line segments, wherein a first average point is {first average point time, first average point value} and a second average point is {second average point time, second average point value}, the slope S of the line segment may be determined as:

$$S = \frac{\text{second average value} - \text{first average value}}{\text{second average time} - \text{first average time}}$$

A linear function connecting a first average point with a second average point may be expressed using an equation of the line L=S*time+B, where S is a slope defined above, "time" is a time coordinate value and B is an "value-intercept" of the line, i.e., a value coordinate where the line intersects the value axis. This can be rewritten as value-value$_1$=$S$*(time-time$_1$), where {time$_1$, value$_1$} are Cartesian coordinates of one of the point on the line.

For example, if a slope S is computed for a first average point and the second average point, the equation of the line that connects the first average point with the second average point, wherein the first average point is expressed as {first time$_1$, first value$_1$}, may be represented as:

value-first value$_1$=$S$*(time-time$_1$).

This can be rewritten as:

value=$S$*time+(first value$_1$)-$S$*time$_1$.

The equation "value=S*time+(first value₁)−S*time₁" is one of the various forms of a line function that connects two average points, as described above.

In an embodiment, a line equation is used to determine a line segment function that connects two average points. As depicted in FIG. 4, a first line segment 410 connects a first average point 310 with a second average point 312; a second line segment 412 connects the second average point 312 with a third average point 314; a third line segment 414 connects the third average point 314 with a fourth average point 316.

Referring again to FIG. 4, in an embodiment, three line segments have been determined: a first line segment 410, as second line segment 412 and a third line segment 414. The line equations associated with each of the line segments may be used to determine a reconstructed value for a particular time coordinate as long as the particular time coordinate belongs to time domain 202 for which the line segments have been determined.

In an embodiment, line segments are constructed also for maximum value points in the clusters. Referring again to FIG. 4, in an embodiment, the following maximum value points have been already determined: a first maximum value point 224, a second maximum value point 234, a third maximum value point 242 and a fourth maximum value point 264.

In an embodiment, a line equation is used to determine a line segment function that connects two maximum points. As depicted in FIG. 4, a first maximum line segment 460 connects a first maximum value point 224 with a second maximum value point 234; a second maximum line segment 462 connects the second maximum value point 234 with a third maximum value point 242; a third maximum line segment 464 connects the third maximum value point 242 with a fourth maximum value point 264.

Referring again to FIG. 4, in an embodiment, three maximum line segments have been determined: a first maximum line segment 460, as second maximum line segment 462 and a maximum third line segment 464. The line equations associated with each of the maximum line segments may be used to determine a reconstructed maximum value for a particular time coordinate as long as the particular time coordinate belongs to time domain 202 for which the line segments have been determined.

In an embodiment, line segments are constructed also for minimum value points, which are determined based on collected raw data as described above. Referring again to FIG. 4, in an embodiment, in the depicted Cartesian coordinate system, the following minimum value points have been already determined: a first minimum value point 222, a second minimum value point 232, a third minimum value point 242 and a fourth minimum value point 262.

In an embodiment, a line equation is used to determine a line segment function that connects two minimum points. As depicted in FIG. 4, a first minimum line segment 450 connects a first minimum value point 222 with a second minimum value point 232; a second minimum line segment 452 connects the second minimum value point 232 with a third minimum value point 242; a third minimum line segment 454 connects the third minimum value point 242 with a fourth minimum value point 262.

Referring again to FIG. 4, in an embodiment, three minimum line segments have been determined: a first minimum line segment 450, as second minimum line segment 452 and a minimum third line segment 454. The line equations associated with each of the minimum line segments may be used to determine a reconstructed minimum value for a particular time coordinate as long as the particular time coordinate belongs to time domain 202 for which the line segments have been determined.

In an embodiment, instead of storing all collected raw data, only aggregate data are stored. For example, instead of storing all collected raw data, only average points, determined as described in reference to FIG. 3, are stored. According to another example, instead of storing all collected raw data, only average points, maximum value points and minimum value points, determined as described in reference to FIG. 3-4, are stored. In each of the above examples, the amount of the stored data may be smaller than the amount of all collected raw data.

The amount of the stored data may be reduced if maximum value points and minimum value points are stored instead of storing all the collected raw data.

In an embodiment, instead of storing all N collected raw data, only average points, maximum value points and minimum value points, determined as described in reference to FIG. 3-4, are stored. If N collected raw data points are partitioned into clusters and each cluster contains M raw data points, where each raw data point belongs only to one cluster, then storing the average data points, maximum value points and minimum value points, determined as described above, involves storing $3*2*(N/M)$ values (assuming that $N\div M=k$, where k is an integer).

6.0 Reconstructing a Data Point Using Aggregate Data

Figure 5:
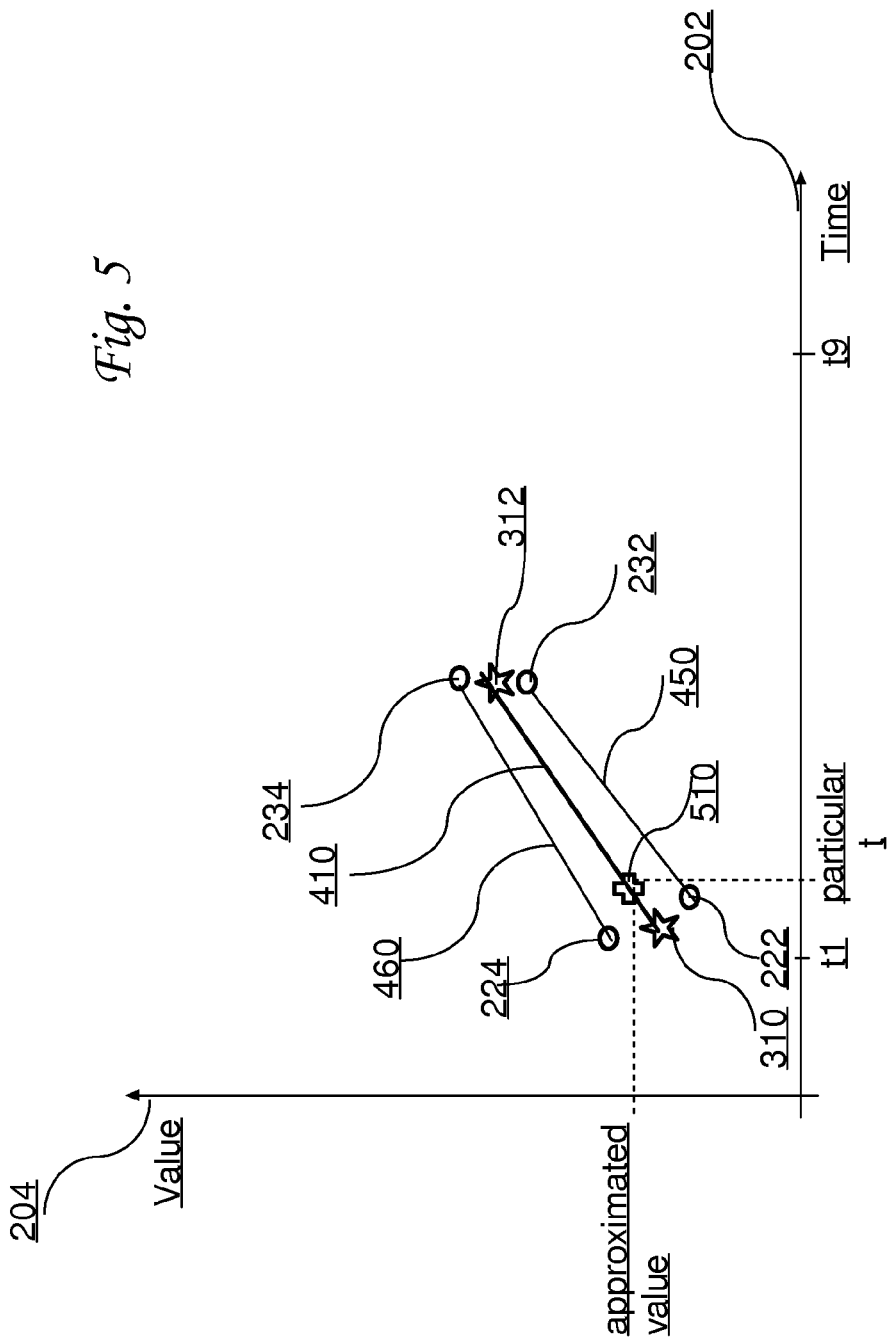
FIG. 5 illustrates an embodiment of reconstructing a data point.

FIG. 5 illustrates an embodiment of reconstructing a data point 510 for a particular time coordinate. In an embodiment depicted in FIG. 5, in a two-dimensional Cartesian coordinate system, having a time axis 202 and a value axis 204, a reconstructed data point 510 is determined for the particular time coordinate. The reconstructed data point 510 is determined based on the average points 310 and 312 for a line segment 410, defined over a time subdomain that includes the particular time.

In an embodiment, determining a reconstructed data point 510 for a particular time coordinate starts from determining a line segment for which a time subdomain includes the particular time. This may be accomplished by searching time subdomains for the clusters of data points, and determining a subdomain that includes the particular time coordinate, then determining two corresponding clusters, and then determining two corresponding average points, one in each of the corresponding clusters. Once two average points are found, the reconstructed data point 510 may be determined.

Referring again to FIG. 5, in an embodiment, a request to provide a data point 510 for a particular time is received. Assume for purposes of an example that actual data for the particular time was not stored; for example, the data at the particular time may have been aggregated with other data. It is determined that the particular time coordinate value belongs to a time subdomain that is between a first cluster and a second cluster and that the corresponding average points are a first average point 310 and a second average point 312.

In an embodiment, using information about a first average point 310 and a second average point 312, a line segment 410 that connects two average points 310, 312 is determined. One of the methods for determining the line segment 410 and a corresponding linear function was described in reference to FIG. 4.

In an embodiment, a reconstructed data point 510 is located at an intersection point at which a particular coordinate intersects a line segment 410. The line segment 410 connects a first average point 310 and a second average point 312. The reconstructed data point 510 is a value of the linear function for the line segment 410 at the particular time.

In an embodiment, a reconstructed data point 510 has an associated pair {time, value} in a two-dimensional Cartesian coordinate system. Referring again to FIG. 5, reconstructed data point 510 has an approximated value, projected onto a value axis 204 and a particular time, projected onto a time axis 202. The reconstructed data point 510, with the approximated value, may be provided as a substitute for the actual data, which was not stored.

By partitioning raw data into clusters and determining an average data point for the cluster, each reconstructed data point that is provided as a substitute for a non-stored data point can approximate an overall behavior of the system. By observing the average data points, it can be determined whether the values of the average points in the clusters rise from a cluster to cluster, or fall from a cluster to cluster. Thus, reconstructing data point for a particular time coordinate value from a mere approximation of raw data points is sufficient in many applications to determine an overall tendency from a cluster to cluster.

Figure 6:
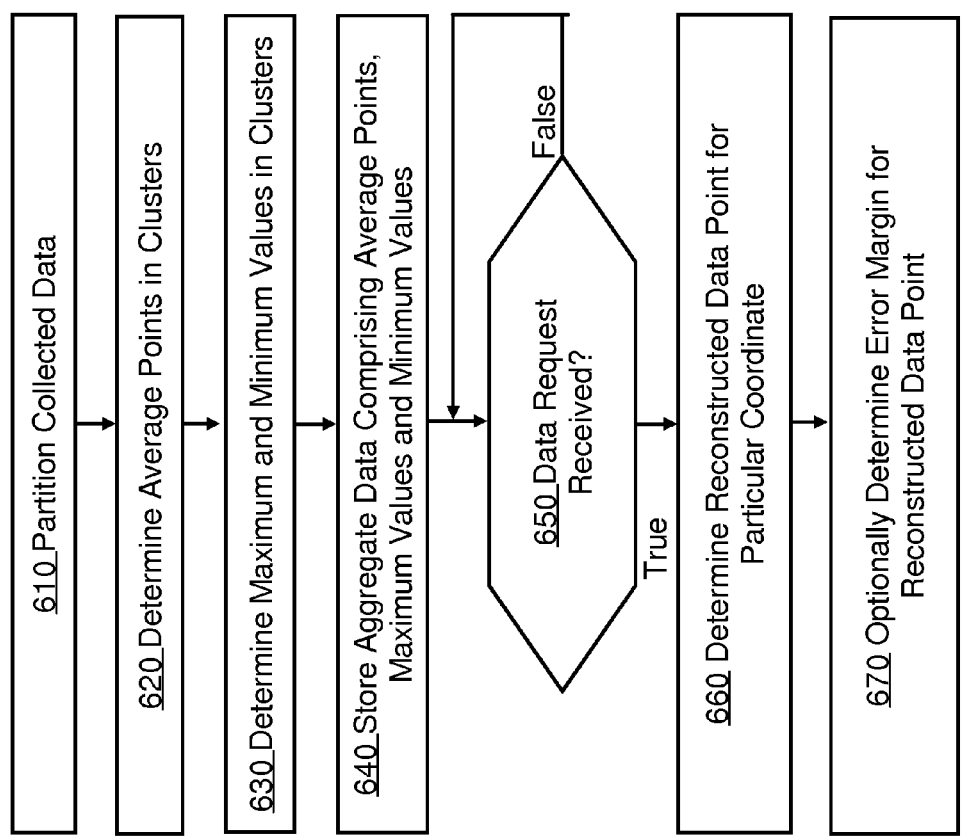
FIG. 6 illustrates an embodiment of generating aggregate data and reconstructing a data point from the aggregate data.

FIG. 6 illustrates an embodiment of generating aggregate data and reconstructing a data point from the aggregate data. In step 610, upon receiving raw data from a data generator or data collector, a data analyzer unit partitions the collected raw data. The collected data may be partitioned in a variety of ways. For example, the collected data may be partitioned in groups containing a fixed quantity of raw data. For instance, if the preset size of the group is ten, then the first ten raw data elements may be partitioned into the first group, the next ten raw data elements may be partitioned into the second group, and so forth.

In an embodiment, the number and the size of the clusters may be adjusted. For example, the clusters may be modified to contain only those subsequent elements that have values within a predetermined radius. For instance, a cluster may contain only those subsequent elements for which an absolute value of the difference between the maximum raw data element and the minimum raw data element does not exceed the predetermined value. The raw data elements that do not meet that criterion may become members of a new cluster.

In step 620, a data analyzer unit determines average points in clusters. Determining an average point in a cluster is performed by computing a new data point that may or may not coincide with any of the collected raw data point. An average point in the cluster may be analogized to computing a data point that is representative of the cluster. Various methods for determining an average point in a cluster have been described above.

In step 630, a data aggregator unit determines maximum and minimum values in each cluster. Determining a minimum point in a cluster may be performed by sorting the raw data points in the cluster and selecting the raw data point for which the value is smaller than any other raw data point value in the cluster. If the condition is met by more than one raw data points, then any of the raw data points that satisfy the condition may be chosen randomly and selected as a minimum raw data point for the cluster.

Determining a maximum point in the cluster may be performed by sorting the raw data points in the cluster and selecting the raw data point for which the value is larger than any other raw data point value in the cluster. If the condition is met by more than one raw data point values in the cluster, then any of the raw data points that satisfy the condition may be chosen randomly and selected as a maximum raw data point for the cluster.

In an embodiment, a minimum value and a maximum value in a cluster determine a range of values for all the raw data points in the cluster. In an embodiment, the minimum value, the maximum value and the average value in the cluster may be different raw data points. In an embodiment, the minimum value, the maximum value and the average value may coincide and thus related to the same raw data point.

In step 640, a data aggregator unit stores aggregate data for each cluster. For example, for each cluster, the data aggregator unit may store an average point (average value), a minimum value and a maximum value. The three values represent the raw data for the cluster. For example, if a cluster has ten elements, an average point, as computed from the raw data in the cluster, may or may not correspond to any actual raw data. However, the minimum value corresponds to an actual raw data and so does the maximum value.

In an embodiment, a data aggregator unit also stores an argument range for each cluster. For example, if a first cluster comprises five raw data points collected at $time_1$, $time_2$, $time_3$, $time_4$ and $time_5$, then the data aggregator unit may store the minimum time ($time_1$) and the maximum time ($time_5$) as the argument range for the raw data points in the cluster. The argument range may be used for reconstructing a data point if a query for the data point is received.

In step 650, a query handler unit receives a data request. A data request may be received online or offline and from a variety of requestors. For example, a data request may be sent from a user who is interested in determining, based on the aggregate data for the collected raw data, a data value at a particular $time_x$. A data request may be received from a software application that processes the aggregate data for the collected raw data and wishes to obtain, based on the aggregate data for the collected raw data, the data value for a particular $time_x$.

In an embodiment, a data request for the data value at a particular time, is a request for an approximated or estimated data value, not necessarily for an exact data value. In fact, the likelihood that the exact data value for the particular time, was indeed collected is relatively low. Furthermore, a requestor that made the request may not even expect to receive the exact raw data value for the particular time, because, most likely, the requestor is interested in the approximated or estimated data value that would coincide with an overall trend of the raw data, not the actual raw data point.

In an embodiment, a data request for the data value for a particular time, is handled by processing average data, not the raw data themselves. Since storing all collected raw data would require a significant storage capacity and a significant processing power, aggregate data are determined and saved, as described above. In the majority of applications, storing the aggregate data requires a smaller storage space than storing the collected raw data. Furthermore, performing a search, sorting and organizing the aggregate data are less time consuming and less computationally complex than processing the raw data. Therefore, handling the data request based on the aggregate data is faster, more efficient and requires less storage space than handling the collected raw data.

In an embodiment, a data request is received to reconstruct a value for a data point for a particular time value $time_x$. The query is processed to determine whether the query is valid and whether search results may be generated for the query. If the query is found to be valid, the query and the query parameters are transmitted to a data reconstructor unit.

In an embodiment, a data request may provide a variety of parameters that specify the particular coordinate for which the value for the data point should be reconstructed. For example, the data request may specify that the sought value is for a data point that would have been collected at time$_x$.

In step 660, a data reconstructor unit reconstructs a value for a data point for a particular coordinate. In an embodiment, the value for the data point is reconstructed using aggregate data, not the collected raw data.

In an embodiment, the reconstruction of a value for a data point is performed by employing approximation and/or estimation techniques. Once the value of the data point for a particular coordinate is determined, the value is provided to a user. For example, the value may be displayed in a screen display of a Graphics User Interface ("GUI") of a network management station. According to another example, the value may be sent to the user in a form of an email, instant message, etc.

In an embodiment, reconstructing a value for a data point for a particular coordinate comprises determining a time subdomain to which the particular coordinate (time$_x$) belongs. Once the subdomain for the particular coordinate is determined, a corresponding first average point and a second average point for that subdomain are retrieved.

In an embodiment, using information about a first average point and a second average point, a line segment that connects the two average points is determined. The methods for determining the line segment and a corresponding linear function were described in reference to FIG. 4.

In an embodiment, a reconstructed data point is located at an intersection point at which a particular coordinate intersects a line segment that connects a first average point and a second average point. Reconstructed data point for the particular coordinate was described in reference to FIG. 5.

In an embodiment, a reconstructed data point may be provided to a user as a pair of two values: {time$_x$, value}. The reconstructed data point is indeed just an approximation of what a raw data point would have been if the raw data point were collected for time$_x$.

Step 670 is optional. In step 670, a data reconstructor unit may determine an error margin for the reconstructed data point. Determining an error margin is optional because error bounds may not have to be requested. For example, a user may be not interested in knowing the error bounds for the reconstructed data point since it is known that the reconstructed data point is an approximation of the data point and some error margin is obviously built into the data point reconstruction process.

In an embodiment, an error margin is an error estimate or an error approximation. Since the data reconstructor unit processes aggregate data and the aggregate data are representatives of the collected raw data, the data reconstructor unit can approximate the error margin associated with the reconstructed data point.

In an embodiment, a data reconstructor unit determines an error margin for a reconstructed data point at a particular coordinate (time$_x$) based on the reconstructed data point value, minimum values and maximum values for a time subdomain to which the particular coordinate (time$_x$) belongs.

Figure 7:
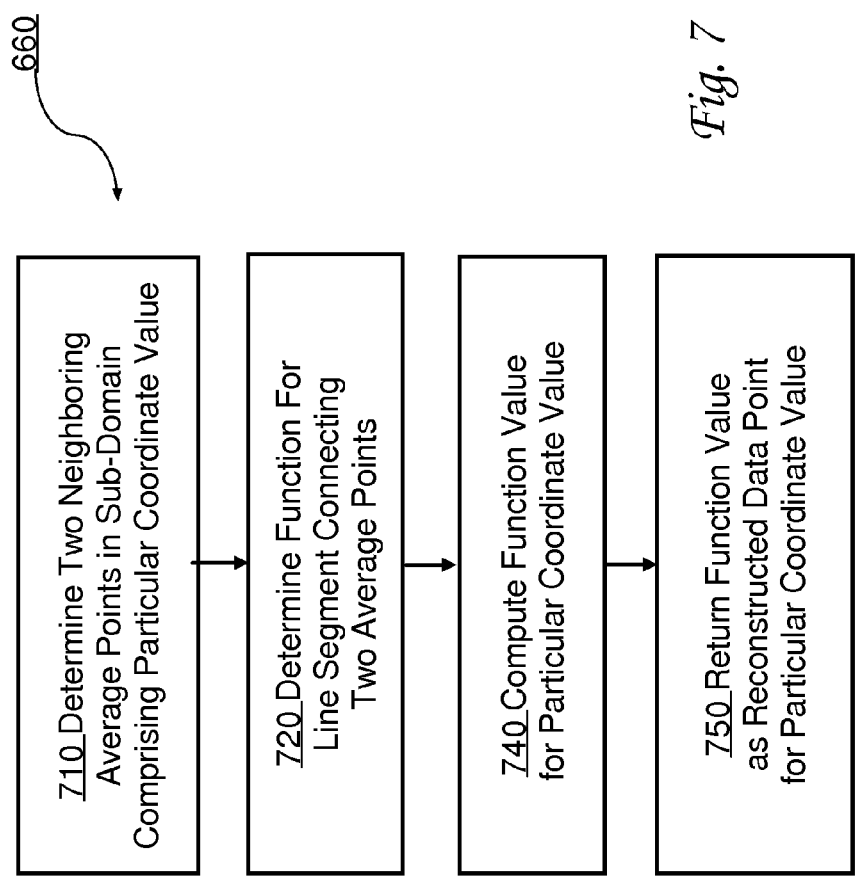
FIG. 7 illustrates an embodiment of reconstructing a data point from aggregate data.

FIG. 7 illustrates an embodiment of reconstructing a data point from aggregate data. A request to reconstruct a data point value for a particular coordinate value is received. In an embodiment, the particular coordinate value is a time value time$_x$, defined in a time domain. Using the approach described above, two clusters that are defined over a time subdomain containing the particular coordinate value are determined.

In step 710, two neighboring average points that belong to the subdomain that comprises a particular coordinate value are determined.

In step 720, a line function is determined for a line segment that connects the two average points determined in step 710. Various methods for determining the line function were described above.

In step 740, using the line function determined in step 720, a line function value for the particular coordinate is determined. The line function value corresponds to an intersection point in which the line function determined in step 720 intersects a vertical line passing via the particular coordinate time$_x$.

In step 750, the line function value is returned as a result to the query. The line function value is a reconstructed data point that was reconstructed from aggregate data for the particular coordinate time value. The reconstructed data point is a reconstructed-approximated-value that maintains overall characteristics of the collected raw data points.

7.0 Implementation Mechanism—Hardware Overview

Figure 8:
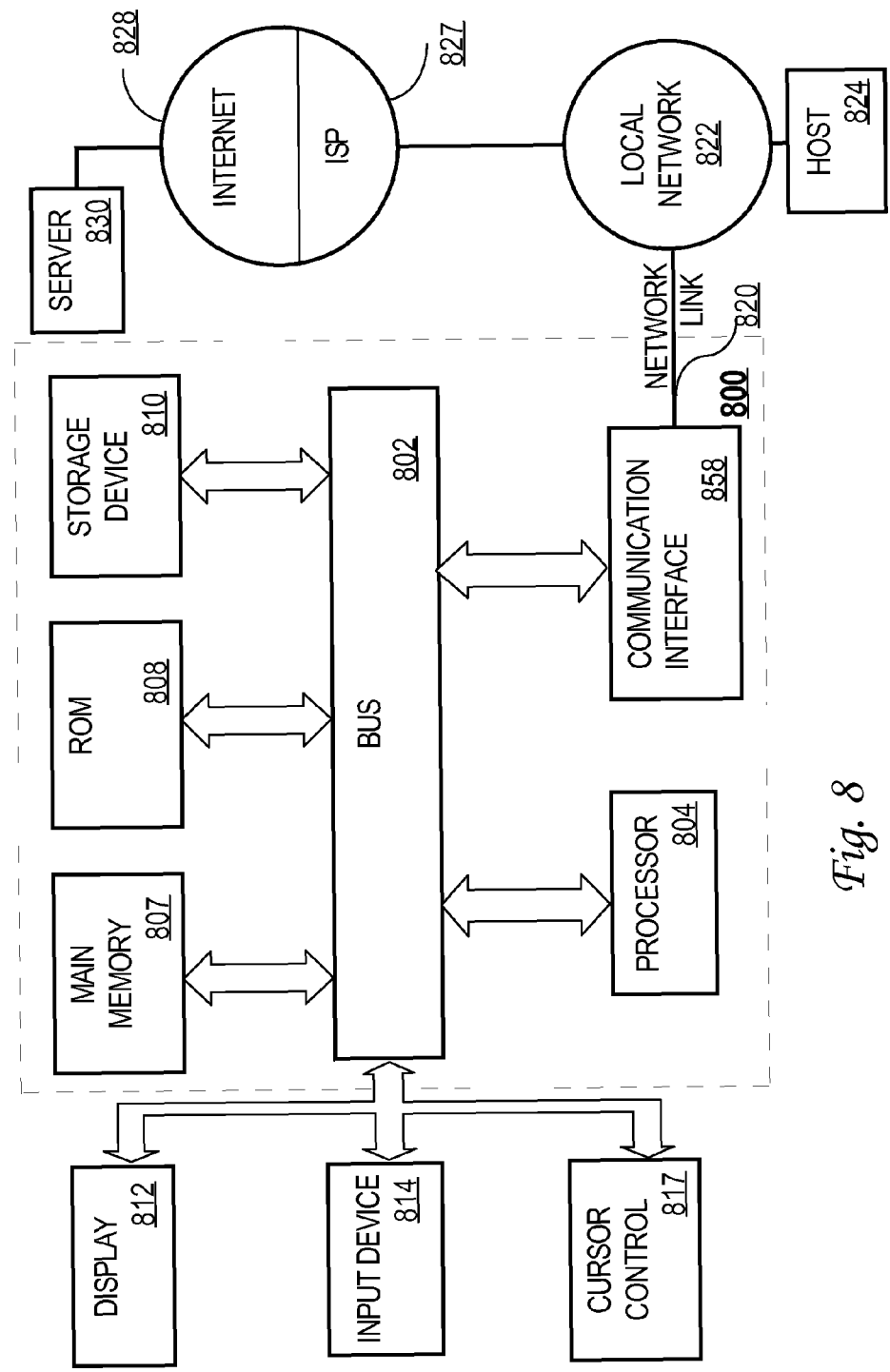
FIG. 8 illustrates a computer system upon which an embodiment may be implemented.

FIG. 8 is a block diagram that illustrates a computer system 800 upon which an embodiment of the invention may be implemented. The preferred embodiment is implemented using one or more computer programs running on a network element such as a router device. Thus, in this embodiment, the computer system 800 is a router.

Computer system 800 includes a bus 802 or other communication mechanism for communicating information, and a processor 804 coupled with bus 802 for processing information. Computer system 800 also includes a main memory 806, such as a random access memory (RAM), flash memory, or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk, flash memory or optical disk, is provided and coupled to bus 802 for storing information and instructions.

A communication interface 818 may be coupled to bus 802 for communicating information and command selections to processor 804. Interface 818 is a conventional serial interface such as an RS-232 or RS-422 interface. An external terminal 812 or other computer system connects to the computer system 800 and provides commands to it using the interface 818. Firmware or software running in the computer system 800 provides a terminal interface or character-based command interface so that external commands can be given to the computer system.

A switching system 816 is coupled to bus 802 and has an input interface 814 and an output interface 819 to one or more external network elements. The external network elements may include a local network 822 coupled to one or more hosts 824, or a global network such as Internet 828 having one or more servers 830. The switching system 816 switches information traffic arriving on input interface 814 to output interface 819 according to pre-determined protocols and conventions that are well known. For example, switching system 816, in cooperation with processor 804, can determine a destination of a packet of data arriving on input interface 814 and send it to the correct destination using output interface 819. The destinations may include host 824, server 830, other end stations, or other routing and switching devices in local network 822 or Internet 828.

According to one embodiment, compliance management is provided by computer system 800 in response to processor 804 executing one or more sequences of one or more instructions contained in main memory 806. Such instructions may be read into main memory 806 from another computer-readable storage medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any medium that participates in providing instructions to processor 804 for execution. Such a medium may take many forms, including but not limited to, non-transitory and non-volatile storage media and non-transitory volatile storage media. Non-volatile storage media includes, for example, optical or magnetic disks, such as storage device 810. Volatile storage media includes dynamic memory, such as main memory 806.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other non-transitory, tangible storage medium from which a computer can read.

Various forms of computer readable storage media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Communication interface 818 also provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for compliance management as described herein. The received code may be executed by processor 804 as it is received, and/or stored in storage device 810, or other non-volatile storage for later execution.

8.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method, comprising:
sorting collected data according to an index from a plurality of indexes;
partitioning the collected data into a plurality of data clusters, wherein each cluster of the plurality of data clusters contains a threshold number of items of the collected data;
based on proximity and density of the collected data in each cluster of the plurality of data clusters, adjusting contents of each cluster of the plurality of data clusters;
for each cluster of the plurality of data clusters, determining an average point of that cluster;
upon receiving a request to reconstruct a data point for a particular coordinate, determining a reconstructed data point by interpolating, at the particular coordinate, between two or more average points of two or more clusters from the plurality of data clusters, wherein no two average points, of the two or more average points, are from a same cluster of the two or more clusters;
wherein the method is performed by one or more processors.

2. The method of claim 1, wherein a size of each cluster of the plurality of data clusters is determined automatically during a system initialization and based on configuration data.

3. The method of claim 1, wherein a size of one or more clusters of the plurality of data clusters may be increased or decreased based on any of: a type of the collected data, a capacity of storage, customer preferences.

4. The method of claim 1, further comprising determining for each cluster of the plurality of data clusters one or more distance values for each pair of points in that cluster, and adjusting the contents of the other clusters of the plurality of data clusters if any of the one or more distance values exceeds a distance threshold value.

5. The method of claim 1, further comprising determining, for each cluster of the plurality of data clusters, a count value of points in that cluster, and adjusting the contents of the other clusters of the plurality of data clusters if any of count values exceeds a density threshold value.

6. The method of claim 1, comprising sorting the collected data based on any one of: a time when the collected data was collected, a type of the collected data, a source that provided the collected data.

7. The method of claim 1, wherein the reconstructed data point comprises an approximated value that is computed for the particular coordinate using aggregate data with accuracy within error bounds; wherein the particular coordinate has a value representing an arbitrary time point in a time domain.

8. A network data processing apparatus, comprising:
one or more processors;
a data analyzer unit configured to: sort collected data according to an index from a plurality of indexes; partition the collected data into a plurality of data clusters, wherein each cluster of the plurality of data clusters contains a threshold number of items of the collected data; based on proximity and density of the collected data in each cluster of the plurality of data clusters, adjust contents of each cluster of the plurality of data clusters;
a data aggregator unit configured to determine, for each cluster in the plurality of data clusters, an average point of the cluster;
a data reconstructor unit configured to determine, upon receiving a request to provide data for a particular coordinate, a reconstructed data point by interpolating, at the particular coordinate, between two or more average points of two or more clusters from the plurality of data clusters, wherein no two average points, of the two or more average points, are from a same cluster of the two or more clusters.

9. The network data processing apparatus of claim 8, wherein a size of each cluster of the plurality of data clusters is determined automatically during a system initialization and based on configuration data.

10. The network data processing apparatus of claim 8, wherein a size of one or more clusters of the plurality of data clusters may be increased or decreased based on any of: a type of the collected data, a capacity of storage, customer preferences.

11. The network data processing apparatus of claim 8, wherein the data reconstructor unit is further configured to determine for each cluster of the plurality of data clusters one or more distance values for each pair of points in that cluster, and adjust the contents of the other clusters of the plurality of data clusters if any of the one or more distance values exceeds a distance threshold value.

12. The network data processing apparatus of claim 8, wherein the data reconstructor unit is further configured to determine for each cluster of the plurality of data clusters a count value of points in that cluster, and adjust the contents of the other clusters of the plurality of data clusters if any of count values exceeds a density threshold value.

13. The network data processing apparatus of claim 8, wherein the data analyzer unit is further configured to sort the collected data based on any one of: a time when the collected data was collected, a type of the collected data, a source that provided the collected data.

14. The network data processing apparatus of claim 8, wherein the reconstructed data point comprises an approximated value that is computed for the particular coordinate using aggregate data with accuracy within error bounds; wherein the particular coordinate has a value representing an arbitrary time point in a time domain.

15. A non-transitory computer-readable storage medium storing one or more sequences of instructions which, when executed by one or more processors, cause performance of steps comprising:
sorting collected data according to an index from a plurality of indexes;
partitioning the collected data into a plurality of data clusters, wherein each cluster of the plurality of data clusters contains a threshold number of items of the collected data;
based on proximity and density of the collected data in each cluster of the plurality of data clusters, adjusting contents of each cluster of the plurality of data clusters;
for each cluster of the plurality of data clusters, determining an average point of that cluster;
upon receiving a request to reconstruct a data point for a particular coordinate, determining a reconstructed data point by interpolating, at the particular coordinate, between two or more average points of two or more clusters from the plurality of data clusters, wherein no two average points, of the two or more average points, are from a same cluster of the two or more clusters.

16. The non-transitory computer-readable storage medium of claim 15, wherein a size of each cluster of the plurality of data clusters is determined automatically during a system initialization and based on configuration data.

17. The non-transitory computer-readable storage medium of claim 15, wherein a size of one or more clusters of the plurality of data clusters may be increased or decreased based on any of: a type of the collected data, a capacity of storage, customer preferences.

18. The non-transitory computer-readable storage medium of claim 15, further comprising instructions which, when executed by the one or more processors, cause performance of steps comprising: determining for each cluster of the plurality of data clusters one or more distance values for each pair of points in that cluster, and adjusting the contents of the other clusters of the plurality of data clusters if any of the one or more distance values exceeds a distance threshold value.

19. The non-transitory computer-readable storage medium of claim 15, further comprising instructions which, when executed by the one or more processors, cause performance of steps comprising: determining, for each cluster of the plurality of data clusters, a count value of points in that cluster, and adjusting the contents of the other clusters of the plurality of data clusters if any of count values exceeds a density threshold value.

20. The non-transitory computer-readable storage medium of claim 15, further comprising instructions which, when executed by the one or more processors, cause performance of steps comprising: sorting the collected data based on any one of: a time when the collected data was collected, a type of the collected data, a source that provided the collected data.

* * * * *